(12) United States Patent
Kempf et al.

(10) Patent No.: US 11,280,907 B2
(45) Date of Patent: Mar. 22, 2022

(54) DEPTH IMAGING SYSTEM

(71) Applicant: TEXAS INSTRUMENTS INCORPORATED, Dallas, TX (US)

(72) Inventors: Jeffrey Matthew Kempf, Dallas, TX (US); Vikrant R. Bhakta, Dallas, TX (US); Jeffrey Scott Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/235,338

(22) Filed: Dec. 28, 2018

(65) Prior Publication Data

US 2020/0209398 A1 Jul. 2, 2020

(51) Int. Cl.
| | |
|---|---|
| G01S 17/89 | (2020.01) |
| G01S 17/42 | (2006.01) |
| G02B 27/28 | (2006.01) |
| G02B 5/28 | (2006.01) |
| H04N 13/254 | (2018.01) |
| H04N 13/218 | (2018.01) |

(52) U.S. Cl.
CPC .............. *G01S 17/89* (2013.01); *G01S 17/42* (2013.01); *G02B 5/28* (2013.01); *G02B 27/286* (2013.01); *G02B 27/288* (2013.01); *H04N 13/218* (2018.05); *H04N 13/254* (2018.05)

(58) Field of Classification Search
CPC ............................ G01S 17/936; G01S 7/4817
See application file for complete search history.

(56) References Cited

U.S. PATENT DOCUMENTS

| | | | | |
|---|---|---|---|---|
| 10,007,001 | B1* | 6/2018 | LaChapelle | G01S 7/484 |
| 10,222,474 | B1* | 3/2019 | Raring | H01S 5/02212 |
| 2010/0165322 | A1* | 7/2010 | Kane | G01S 7/481 |
| | | | | 356/4.01 |
| 2010/0328644 | A1* | 12/2010 | Lu | H04N 5/217 |
| | | | | 356/5.01 |
| 2011/0122627 | A1* | 5/2011 | Hikmet | F21S 10/00 |
| | | | | 362/259 |
| 2012/0038903 | A1* | 2/2012 | Weimer | G01S 7/484 |
| | | | | 356/4.07 |
| 2017/0357000 | A1* | 12/2017 | Bartlett | G01S 7/4817 |
| 2019/0018120 | A1* | 1/2019 | Efimov | G01S 7/4818 |

* cited by examiner

*Primary Examiner* — Kyle M Lotfi
(74) *Attorney, Agent, or Firm* — Michelle F. Murray; Charles A. Brill; Frank D. Cimino (57) ABSTRACT

A depth imaging system includes an optical image sensor, an optical beam steering system, an object identification system, and a depth measurement system. The object identification system is coupled to the optical image sensor. The object identification system is configured to identify an object in an image captured by the optical image sensor. The depth measurement system is coupled to the optical beam steering device. The depth measurement system is configured to, responsive to identification of the object by the object identification system: direct an optical signal, via the optical beam steering device, to the object, and to determine a distance to the object based on a time-of-flight of the optical signal.

20 Claims, 5 Drawing Sheets

DEPTH IMAGING SYSTEM

BACKGROUND

Depth imaging involves using a depth sensor to image a scene in three dimensions: x, y and z. The approaches to depth imaging include stereo-vision, structured light, and time-of-flight sensing. Stereo vision systems use two sensors that are spaced apart to capture an image of a scene. The different positions of corresponding pixels in the images captured by the two sensors provides the depth information. Structured light systems illuminate a scene with a spatially varying pattern. Depth variation in the scene produces distortion in an image of the scene captured by an image sensor, and the distortion is analyzed to extract depth information. Time-of-flight sensors operate by emitting light from a light source and detecting the light reflected from a surface of an object. The round-trip travel time-of-flight emitted from the light source and reflected from the object back to the sensor is measured. With the time-of-flight information, and knowledge of the speed of light, the distance to the object can be determined.

SUMMARY

Depth imaging systems that reduce computational complexity are disclosed herein. In one example, a depth imaging system includes an optical image sensor, an optical beam steering system, an object identification system, and a depth measurement system. The object identification system is coupled to the optical image sensor. The object identification system is configured to identify an object in an image captured by the optical image sensor. The depth measurement system is coupled to the optical beam steering device. The depth measurement system is configured to, responsive to identification of the object by the object identification system: direct an optical signal, via the optical beam steering device, to the object, and determine a distance to the object based on a time-of-flight or phase of the optical signal.

In another example, a depth imaging system includes an optical image sensor, an object identification system, an object tracking system, an optical beam steering device, an optical signal source, a photodiode, and a depth measurement system. The object identification system is coupled to the optical image sensor. The object identification system is configured to identify an object in an image captured by the optical image sensor. The object tracking system is configured to generate a predicted location of the object at a future time. The depth measurement system is coupled to the optical beam steering device. The optical beam steering device includes a digital micromirror device or a phase spatial light modulator. The optical signal source is configured to generate an optical signal. The photodiode is configured to detect a reflection of the optical signal. The depth measurement system is configured to, responsive to identification of the object by the object identification system: direct the optical signal, via the optical beam steering device, to a plurality of points in a predetermined area about the predicted location of the object; identify one or more of the points corresponding to the object based on an image captured by the optical image sensor coincident with transmission of the optical signal; and determine a distance to the object based on a time-of-flight of the optical signal to the one or more of the points.

In a further example, a method for depth imaging includes capturing an image by an optical image sensor. An object in the image is identified. Responsive to identifying the object, a beam steering device is configured to direct an optical signal to a location of the object in the image, and a distance to the object is determined based on a time-of-flight or phase of the optical signal.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

While each of the three depth imaging methods (stereo vision, structured light, and time-of-flight) is widely used, each method is subject to particular limitations. Stereo vision is dependent upon textured surfaces, without which it is impossible to extract depth information. For example, stereo vision cannot be used to create a depth map of a featureless white wall. Two variants of structured light scanning are typically employed. One, known as multi-shot scanning, requires relatively long camera exposure times, and is therefore unsuitable for characterizing moving objects. The other, known as single-shot scanning, is computationally burdensome, and employs a sophisticated image processing algorithm to derive a three-dimensional (3D) point cloud, which requires expensive processors with relatively high power consumption. In 3D time-of-flight (TOF), a laser acts as a flash, illuminating an entire scene, and a reflected signal is processed to construct a 3D point cloud. Under challenging ambient conditions, e.g., a sun-exposed outdoor location, it is difficult to isolate the reflected signal. Moreover, manufacturing constraints make it difficult to produce a low-cost, high-resolution imager. Consequently, the majority of 3D TOF sensors provide relatively low resolution, i.e., 320×240 pixels or less.

The depth imaging system disclosed herein applies two-dimensional (2D) image processing to reduce the computational complexity of 3D TOF depth imaging. In implementations of this description, 2D processing (e.g., semantic segmentation) is used to identify objects in an image, and 3D TOF is applied to a limited area about the detected object. Thus, depth processing may be applied only to objects of interest, rather than to the full scene, which greatly reduces the number of points processed, and in turn reduces the computational complexity of, and power consumed by, depth processing. The depth processing system simplifies the illumination of an object of interest by co-locating the 2D image sensor and the beam steering device used to direct an optical signal to the detected object. Because the 2D image sensor and beam steering device are co-located, the beam steering elements that are co-located which the pixels corresponding to an identified object may be selected to direct an optical signal to the object.

The beam steering device may be a digital micromirror device (DMD), or a phase spatial light modulator (PSLM). In implementations using a DMD as the beam steering device, the DMD can be used to both transmit light to an object and to receive light reflected from the object, which provides a high level of background rejection (e.g., the square of the device contrast). Additionally, off-state recycling may be implemented to provide improved illumination efficiency. In implementations using a PSLM as the beam steering device, the PSLM can efficiently focus all light energy on an object, which improves contrast in high ambient light conditions. Some implementations may include a PSLM in the transmit path and a DMD in the receive path to further increase background rejection.

The depth imaging system of this description may also apply object tracking to predict the location of an object identified by 2D image processing. For example, if an object identified by 2D image processing is moving, then the location of the object may change between the time of detection and the initiation of 3D TOF activation. The depth imaging system may illuminate any number of randomly selected points within a predetermined area about the predicted location of object. A 2D image captured at the time of illumination may be used to determine the location of the object, and points of illumination corresponding to the object processed for depth information.

Implementations of the depth imaging systems disclosed herein may be used in a variety of applications to reduce computational complexity, reduce power consumption, and/ or increase depth resolution. For example, the depth imaging systems may be used in an advanced driver assistance system (ADAS) to determine the distance from a vehicle to specific objects in the vehicle's operating environment. In another example, the depth imaging systems may be used in a facial recognition system to measure the distance to only selected facial features.

Figure 1:
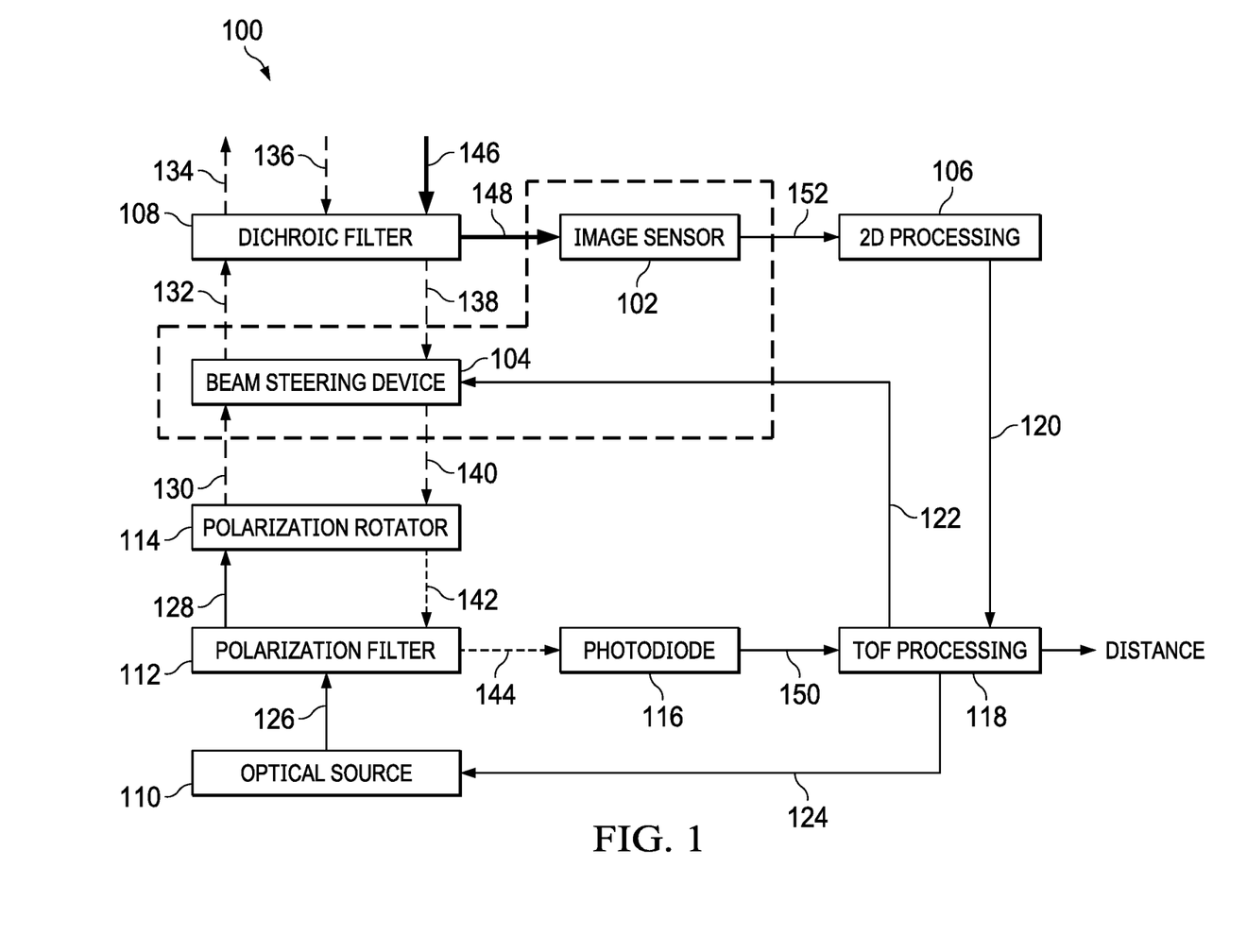
FIG. 1 shows a block diagram of an example depth imaging system in accordance with this description.

FIG. 1 shows a block diagram of an example depth imaging system 100 in accordance with this description. The depth imaging system 100 includes an optical image sensor 102, an optical beam steering device 104, 2D signal processing circuitry 106, a dichroic filter 108, an optical signal source 110, a polarization filter 112, a polarization rotator 114, a photodiode 116, and TOF processing circuitry 118. The optical image sensor 102 is an infrared or visible light camera that detects light on a 2D array of optical sensors. The optical beam steering device 104 is a DMD that includes a 2D array of micromirrors that are controllable to reflect an optical signal towards a target location or towards a light sink. Alternatively, the optical beam steering device 104 is a PSLM that includes a plurality of mirrors that are movable to steer reflected light towards a target. In implementations of the depth imaging system 100, the optical image sensor 102 and the optical beam steering device 104 are co-located such that sensor pixels of the optical image sensor 102 are aligned with beam steering elements (mirrors) of the optical beam steering device 104. Thus, in the depth imaging system 100, light may be directed to the location of an object detected at a given pixel of the optical image sensor 102 by activating the beam steering element of the optical beam steering device 104 that is aligned with the given pixel of the optical image sensor 102.

The dichroic filter 108 directs, to the optical image sensor 102, light 146 received from a scene being imaged and in a band that is detected by the optical image sensor 102. For example, the dichroic filter 108 may reflect visible light or infrared light input to the depth imaging system 100 to the optical image sensor 102 for processing. The dichroic filter 108 passes light 132 generated by the optical signal source 110 and light 136, which includes reflections of the light 134 output by the dichroic filter 108.

The optical image sensor 102 detects light 148 received from the dichroic filter 108, converts the light 148 to electrical signals 152, and provides the electrical signals 152 to the 2D signal processing circuitry 106 as a series of images. Each of the images includes a measurement of the light 148 incident on each of the optical sensors of the optical image sensor 102. The 2D signal processing circuitry 106 processes the electrical signals 152 to extract information therefrom. For example, the 2D signal processing circuitry 106 identifies objects in an image received from the optical image sensor 102. Object identification may include assigning a classification value to each pixel of an image, where the classification values represent objects in, or regions of, the scene. The optical image sensor 102 provides location information 120 to the TOF processing circuitry 118. The location information 120 specifies the location in an image of a selected object. In the depth imaging system 100, the location information 120 may specify pixels of the image or a range of pixels of the image at which the object was detected.

The TOF processing circuitry 118 measures the distance to an object in the image captured by the optical image sensor 102. Given the location information 120, the TOF processing circuitry 118 provides control signals 122 to the optical beam steering device 104, and provides control signals 124 to the optical signal source 110. The optical signal source 110 is a light generator, such as a laser diode that generates an infrared beam 126. Generation of the infrared beam 126 by the optical signal source 110 is controlled by the control signals 124. The control signals 122 activate beam steering elements of the optical beam steering device 104 to direct the infrared beam 126 to the location of object detected in the image. Because the beam steering elements of the optical beam steering device 104 are aligned with the pixels of the image, selection of the beam steering elements to be activated for directing the infrared beam 126 to the object does not require complex computation.

The polarization filter 112 and the polarization rotator 114 are disposed in the optical path between the optical signal source 110 and the optical beam steering device 104. The polarization filter 112 passes the infrared beam 126 generated by the optical signal source 110 and blocks light of other polarizations. The polarization rotator 114 rotates incident light by 45 degrees. Thus, the polarization rotator 114 rotates the light 128 by 45° to produce rotated light 130 that is provided to the optical beam steering device 104. The optical beam steering device 104 reflects the light 130 to produce light 132 that passes through the dichroic filter 108 to illuminate the object identified by the location information 120.

The light 134 output by the dichroic filter 108 is reflected by the object (or other element of the scene illuminated by the light 134) and returned to the dichroic filter 108 as reflected light 136. The dichroic filter 108 passes the light 136, which is provided to the optical beam steering device 104 as optical signal 138, and in turn reflected by the optical beam steering device 104 as optical signal 140. By applying the optical beam steering device 104 in both optical transmit path and the optical receive path, the depth imaging system 100 greatly improves the contrast of the received signal relative to background light. Background rejection is a function of the contrast of the optical beam steering device 104. With the optical beam steering device 104 in both the transmit and receive paths, the background rejection is proportional to the square of the contrast of the optical beam steering device 104. For example, if the optical beam steering device 104 provides contrast of 1000:1, then in the arrangement of the depth imaging system 100, the contrast will be 1000000:1.

The optical signal 140 has the same rotation as the light 130. The polarization rotator 114 rotates the optical signal 140 to produce rotated light 142. The polarization filter 112 blocks the light 142 which is reflected to the photodiode 116 as optical signal 144. The photodiode 116 detects the optical signal 144 and generates an electrical signal 150 corresponding to the optical signal 144. The photodiode 116 provides the electrical signal 150 to the TOF processing circuitry 118, and the TOF processing circuitry 118 measures the distance to the object corresponding to the location information 120 as a function of the travel time of the infrared beam 126 to and from the object and the speed of light.

The TOF processing circuitry 118 may activate the optical signal source 110 any number of times with respect to an object to be imaged to produce a desired resolution of depth data. Because depth measurement is performed only with respect to specific objects identified by the 2D signal processing circuitry 106, high resolution depth data may be acquired for the objects while the overall measurement of depth with respect to the scene is low.

Figure 2:
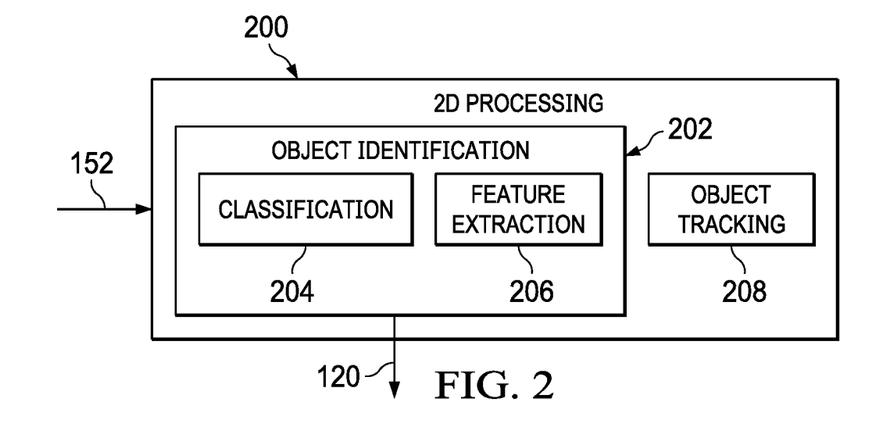
FIG. 2 shows a block diagram of an example two-dimensional image processing system used in a depth processing system in accordance with this description.

FIG. 2 shows a block diagram for an example 2D image processing system 200 used in a depth processing system in accordance with this description. The 2D image processing system 200 is an implementation of the 2D signal processing circuitry 106. The 2D image processing system 200 includes an object identification system 202 that identifies objects in an image received from the optical image sensor 102. The object identification system 202 includes classification 204 and feature extraction 206. The classification 204 classifies the entirety of the image received from the optical image sensor 102 so that a label is assigned to each pixel of the image. Thus, a label may identify the pixels of the image that are associated with an object. The feature extraction 206 identifies features of the objects labeled by the classification 204. Features identified may include boundaries, edges and/or other features that are distinct to a particular object as identified by the label assigned by the classification 204.

The 2D image processing system 200 may also include object tracking 208. The object tracking 208 determines the location of previously identified objects in each of the images received from optical image sensor 102. That is, the object tracking 208 follows an object as the object location changes from frame to frame of video. To facilitate tracking of an object, the object tracking 208 may predict the location of an object in the next image to be received from the optical image sensor 102 based on how the location of the object changed in prior images received from the optical image sensor 102. For example, optical flow of an object may be applied to predict the location of the object in a future image.

The 2D image processing system 200 may be implemented by one or more processors (e.g., microprocessor, digital-signal-processor, a graphics processor, a video processor, etc.) configured to execute instructions that cause the processor to perform the operations (categorization, feature extraction, tracking) disclosed herein.

Figure 3:
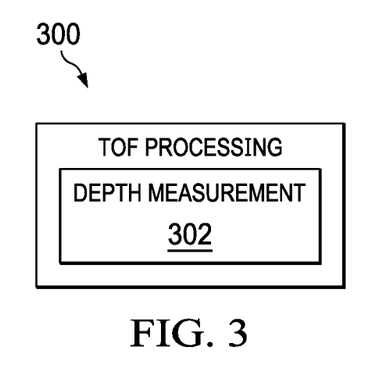
FIG. 3 shows a block diagram of an example time-of-flight processing system used in a depth processing system in accordance with this description.

FIG. 3 shows a block diagram for an example TOF processing system 300 used in a depth processing system in accordance with this description. The TOF processing system 300 is an implementation of the TOF processing circuitry 118. The TOF processing system 300 includes a depth measurement system 302. The depth measurement system 302 measures the distance from the depth imaging system 100 to an object based on the time from transmission of an optical signal by the depth imaging system 100 to reception of a reflection of the optical signal by the depth imaging system 100. The TOF processing system 300 may include phase shift measurement circuit to measure the time between transmission of an optical signal and receipt of a reflection of the optical signal (i.e., TOF), and computation circuitry to compute a distance value based on the measured phase shift and the speed of light. The TOF processing system 300 200 may be implemented using a processor (e.g., microprocessor, digital-signal-processor, a graphics processor, a video processor, etc.) configured to execute instructions that cause the processor to compute distance as a function of TOF.

Figure 4:
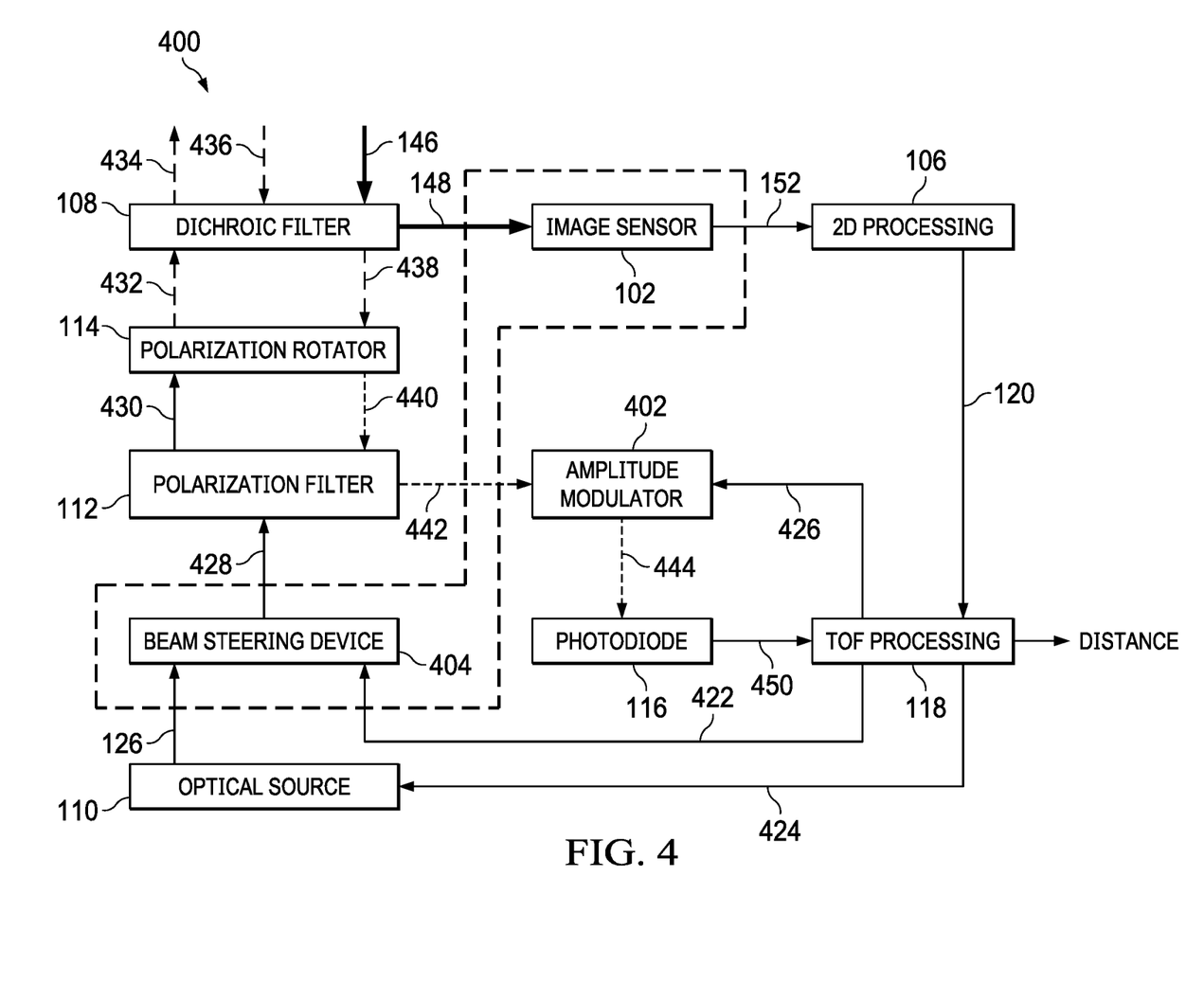
FIG. 4 shows a block diagram of an example depth imaging system in accordance with this description.

FIG. 4 shows a block diagram for an example depth imaging system depth imaging system 400 in accordance with this description. The depth imaging system 400 is similar to the depth imaging system 100 in some respects, but does not apply a DMD as the beam steering device. The depth imaging system 400 includes an image sensor optical image sensor 102, a beam steering device 404, 2D signal processing circuitry 106, a dichroic filter 108, an optical signal source 110, a polarization filter 112, a polarization rotator 114, a photodiode 116, an amplitude modulator 402, and TOF processing circuitry 118. The optical image sensor 102 is an infrared or visible light camera that detects light on a two-dimensional array of optical sensors. The beam steering device 404 is a phase spatial light modulator that includes a two-dimensional array of mirrors that are controllable to focus or steer a light beam by adjusting the phase of light reflected by the mirrors. In implementations of the depth imaging system 400, the optical image sensor 102 and the beam steering device 404 are co-located such that sensor pixels of the optical image sensor 102 are aligned with beam steering elements (mirrors) of the beam steering device 404. Thus, in the depth imaging system 400, light may be directed to the location of an object detected at a given pixel of the optical image sensor 102 by activating the beam steering elements of the beam steering device 404 to focus light at a location corresponding to the given pixel of the optical image sensor 102.

The dichroic filter 108 directs, to the optical image sensor 102, light 146 received from a scene being imaged and in a band that is detected by the optical image sensor 102. For example, the dichroic filter 108 may reflect visible light or infrared light input to the depth imaging system 400 to the optical image sensor 102 for processing. The dichroic filter 108 passes light 132 generated by the optical signal source 110 and light 136, which include reflections of the light 134 output by the dichroic filter 108.

The optical image sensor 102 detects light 148 received from the dichroic filter 108, converts the light 148 to electrical signals 152, and provides the electrical signals 152 to the 2D signal processing circuitry 106 as a series of images (e.g., video frames). Each of the images includes a measurement of the light 148 incident on each of the optical sensors of the optical image sensor 102. The 2D signal processing circuitry 106 processes the electrical signals 152 to extract information therefrom. For example, the 2D signal processing circuitry 106 identifies objects in an image received from the optical image sensor 102. Object identification may include assigning a classification value to each pixel of an image, where each classification value represents a different object. The optical image sensor 102 provides location information 120 to the TOF processing circuitry 118. The location information 120 specifies the location in an image of a selected object. In the depth imaging system 400, the location information 120 may specify pixels of the image, a range of pixels of the image, or other information defining a location at which the object was detected in an image.

The TOF processing circuitry 118 measures the distance to an object in the image captured by the optical image sensor 102. Given the location information 120, the TOF processing circuitry 118 provides control signals 422 to the beam steering device 404, provides control signals 424 to the optical signal source 110, and provides control signals 426 to the amplitude modulator 402. The optical signal source 110 is a light generator, such as a laser diode that generates an infrared beam infrared beam 126. Generation of the infrared beam 126 by the optical signal source 110 is controlled by the control signals 424. The control signals 422 activate beam steering elements of the beam steering device 404 to direct the infrared beam 126 to the location of object detected in the image. Because the beam steering elements of the beam steering device 404 are aligned with the pixels of the image, selection of the beam steering elements to be activated for directing the infrared beam 126 to the object does not require complex computation.

The polarization filter 112 and the polarization rotator 114 are disposed in the optical path between the beam steering device 404 and the dichroic filter 108. The polarization filter 112 passes the polarized optical signal 428 output by the beam steering device 404 and blocks light of other polarizations. The polarization rotator 114 rotates incident light by 45 degrees. Thus, the polarization rotator 114 rotates the light 430 by 45° to produce rotated light 432 that is provided to the dichroic filter 108. The light 432 passes through the dichroic filter 108 as optical signal 434 to illuminate the object identified by the location information 120.

The optical signal 434 output by the dichroic filter 108 is reflected by the object (or other element of the scene illuminated by the optical signal 434) and returned to the dichroic filter 108 as reflected light 436. The dichroic filter 108 passes the reflected light 436, which is provided to the polarization rotator 114 as optical signal 438. The polarization rotator 114 rotates the optical signal 438 to produce rotated light 440. The polarization filter 112 blocks the light 440 which is reflected to the amplitude modulator 402 as optical signal 442. Some implementations of the depth imaging system 400 may omit the amplitude modulator 402 and route the optical signal 442 to the photodiode 116.

The amplitude modulator 402 may be a DMD is some implementations of the depth imaging system 400. The control signals 426 may activate mirrors of the amplitude modulator 402 corresponding to the location of the object detected in the image and illuminated by the optical signal 434. Including the amplitude modulator 402 in the path of the reflected optical signal can increase background rejection by reflecting, to the photodiode 116, only light corresponding to the object being measured. The amplitude modulator 402 reflects the optical signal 442 and provides reflected light 444 to the photodiode 116. The photodiode 116 detects the light 444 and generates an electrical signal 450 corresponding to the detection of the light 444. The photodiode 116 provides the electrical signal 450 to the TOF processing circuitry 118, and the TOF processing circuitry 118 measures the distance to the object corresponding to the location information 120 as function of the travel time of the infrared beam 126 to and from the object and the speed of light.

Figure 5:
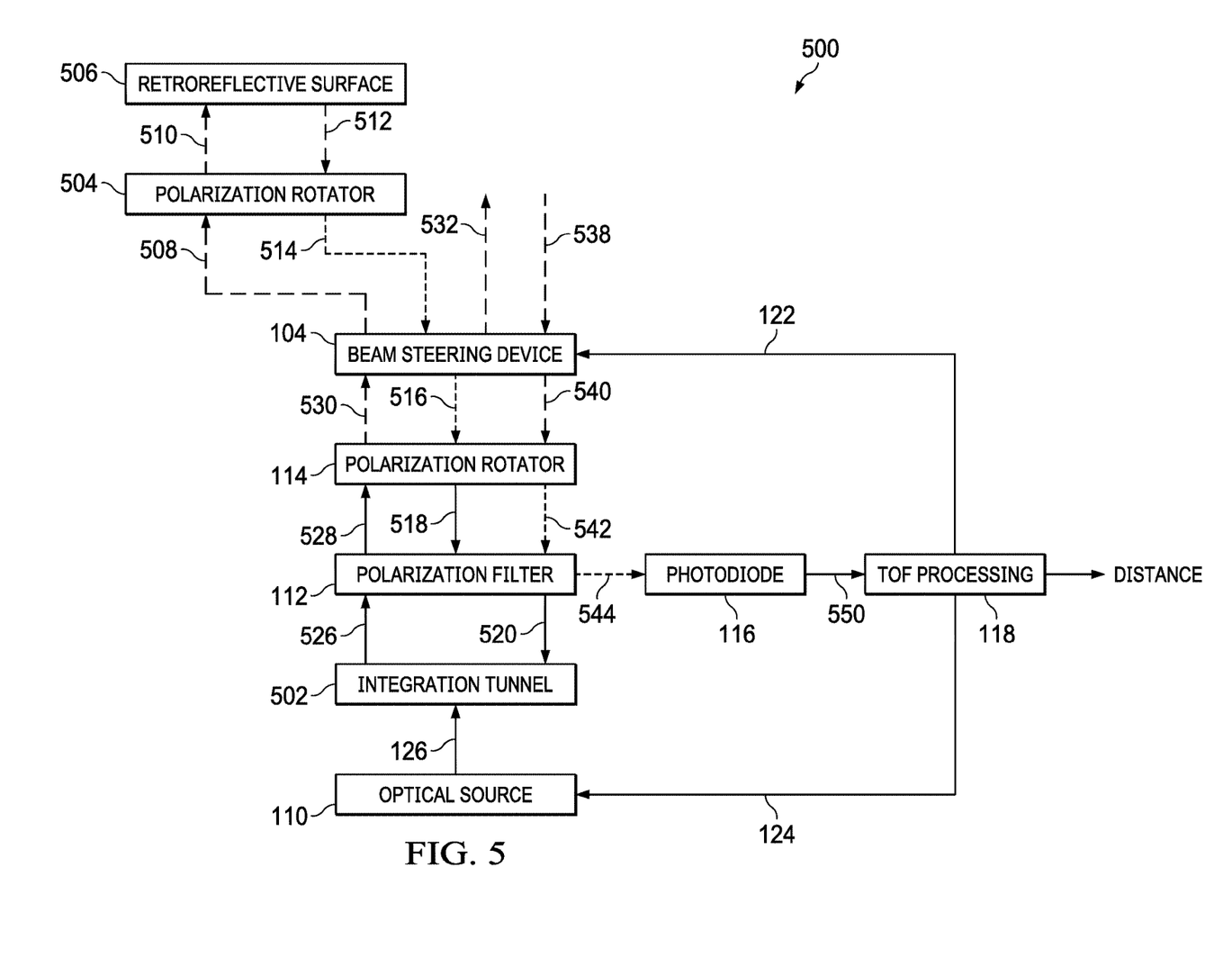
FIG. 5 shows a block diagram of an example depth imaging system that includes off-state light recycling in accordance with this description.

FIG. 5 shows a block diagram for an example depth imaging system 500 that includes off-state light recycling in accordance with this description. The depth imaging system 500 may be included in some implementations of the depth imaging system 100 to add off-state recycling of light reflected by inactive mirrors of the optical beam steering device 104 that increases the gain of the optical output signal. In addition to the components described with respect the depth imaging system 100, the depth imaging system 500 includes the integration tunnel 502, the polarization rotator 504, and the retroreflective surface 506 to provide recycling of off-state light.

The TOF processing circuitry 118 measures the distance to an object in the image captured by the optical image sensor 102. The TOF processing circuitry 118 provides control signals 122 to the optical beam steering device 104, and provides control signals 124 to the optical signal source 110. The optical signal source 110 is a light generator, such as a laser diode that generates an infrared beam infrared beam 126. Generation of the infrared beam 126 by the optical signal source 110 is controlled by the control signals 124. The control signals 122 activate beam steering elements of the optical beam steering device 104 to direct the infrared beam 126 to a selected location.

The integration tunnel 502, the polarization filter 112, and the polarization rotator 114 are disposed in the optical path between the optical signal source 110 and the optical beam steering device 104. The infrared beam 126 enters the integration tunnel 502 via an aperture and the integration tunnel 502 provides optical signal 526 to the polarization filter 112. The integration tunnel 502 combines the infrared beam 126 with off-state light reflected by the retroreflective surface 506 to produce the optical signal 526. In some implementations the integration tunnel 502 may be a cylinder with a reflective inner surface.

The polarization filter 112 passes the optical signal 526 generated by the integration tunnel 502 and blocks light of other polarizations. The polarization rotator 114 rotates incident light by 45 degrees. Thus, the polarization rotator 114 rotates the light 528 by 45° to produce rotated light 530 that is provided to the optical beam steering device 104. The optical beam steering device 104 reflects the light 530 to produce optical signal 532 that is transmitted to illuminate the selected location.

The optical signal 532 output by the optical beam steering device 104 is reflected by an element of the scene illuminated by the optical signal 532 and returned to the optical beam steering device 104 as reflected light 538. The light 538 is provided to the optical beam steering device 104, and in turn reflected by the optical beam steering device 104 as optical signal 540. By applying the optical beam steering device 104 in both optical transmit path and the optical receive path, the depth imaging system 500 greatly improves the contrast of the received signal relative to background light.

The optical signal 540 has the same rotation as the light 530. The polarization rotator 114 rotates the optical signal 540 to produce rotated light 542. The polarization filter 112 blocks the light 542 which is reflected to the photodiode 116 as optical signal 544. The photodiode 116 detects the optical signal 544 and generates an electrical signal 550 corresponding to the optical signal 544. The photodiode 116 provides the electrical signal 550 to the TOF processing circuitry 118, and the TOF processing circuitry 118 measures the distance to the object corresponding to the location information 120 as function of the travel time of the infrared beam 126 to and from the object and the speed of light.

In the optical beam steering device 104, beam steering elements that are not activated to direct the light 530 to the selected location direct light that is not to illuminate the selected location (i.e., off-state light 508) to the polarization rotator 504. Rather than discarding the off-state 508, the depth imaging system 500 recycles the off-state 508. The polarization rotator 504 rotates incident light by 45 degrees. Thus, the polarization rotator 504 rotates the off-state 508 by 45° to produce rotated light 510 that is provided to the retroreflective surface 506. The retroreflective surface 506 reflects the light 510 back to the polarization rotator 504 as optical signal 512. The polarization rotator 504 rotates the optical signal 512 by 45° to produce rotated light 514 that is provided to the optical beam steering device 104.

The optical beam steering device 104 reflects the light 514 to the polarization rotator 114 as optical signal 516. The polarization rotator 114 rotates the optical signal 516 by 45° to produce rotated light 518 that is provided to the polarization filter 112. The polarization filter 112 passes the light 518 to the integration tunnel 502 as light 520. The integration tunnel 502 combines the light 520 with infrared beam 126 to produce the optical signal 526.

Figure 6:
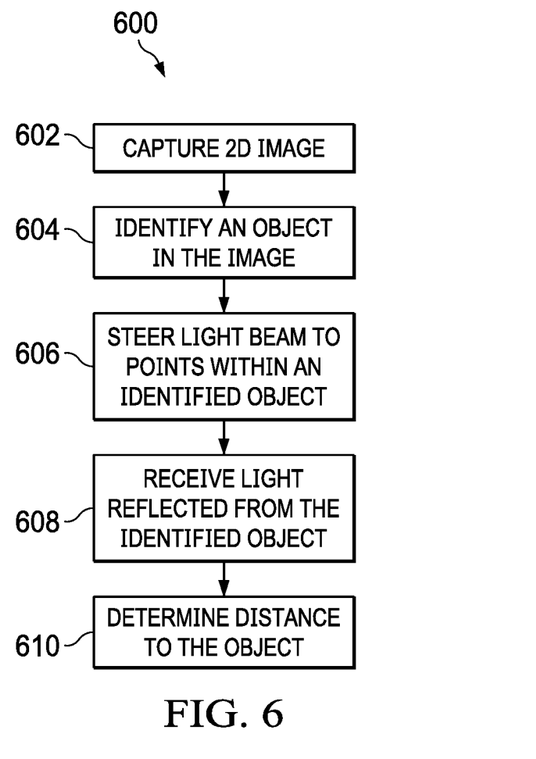
FIG. 6 shows a flow diagram for an example method for depth imaging in accordance with this description.

FIG. 6 shows a flow diagram for an example method 600 for depth imaging in accordance with this description. Though depicted sequentially as a matter of convenience, at least some of the actions shown can be performed in a different order and/or performed in parallel. Additionally, some implementations may perform only some of the actions shown. Operations of the method 600 may be performed by an implementation of the depth imaging system 100 or the depth imaging system 400.

In block 602, the optical image sensor 102 captures a 2D image of a scene. The image may be a visible light image or an infrared image.

In block 604, the 2D signal processing circuitry 106 identifies an object in the 2D image captured by the optical image sensor 102. Identification of the object may include classification of the various regions of the image, where the classification applies a label to each pixel of the image. The labels applied to the pixels may identify objects of interest. For example, in an ADAS, the labels may correspond to automobiles, pedestrians, cycles, buildings, road surfaces, trees, signage, and other objects encountered in the environment of vehicle operation. Identification of an object may also include feature extraction that identifies features, such as edges and boundaries associated with each labeled region of the image.

In block 606, a light beam is steered to illuminate one or more points of the identified object. For example, the optical beam steering device 104 may be controlled to direct a light beam to one or more features of the object. In some implementations, light beams may be produced in a pattern that covers the area of the object (e.g., the area of the region of the image classified as the object) at a predetermined resolution. Because the optical image sensor 102 and the optical beam steering device 104 are co-located, steering of a light beam to a location corresponding to a pixel of the optical image sensor 102 is greatly simplified. In some implementations, the beam steering device 404 may be used to steer the light beams to the object.

In block 608, the light beam generated in block 606 is reflected by the object, and the reflected light is received by the photodiode 116. The reflected light may pass through the optical beam steering device 104 or the amplitude modulator 402 to improve background rejection.

In block 610, the TOF processing circuitry 118 measures the time between transmission of a light beam and detection of a reflection of the light beam (e.g., the phase shift between transmitted and received light). The TOF processing circuitry 118 computes the distance to the object based on the time.

Figure 7:
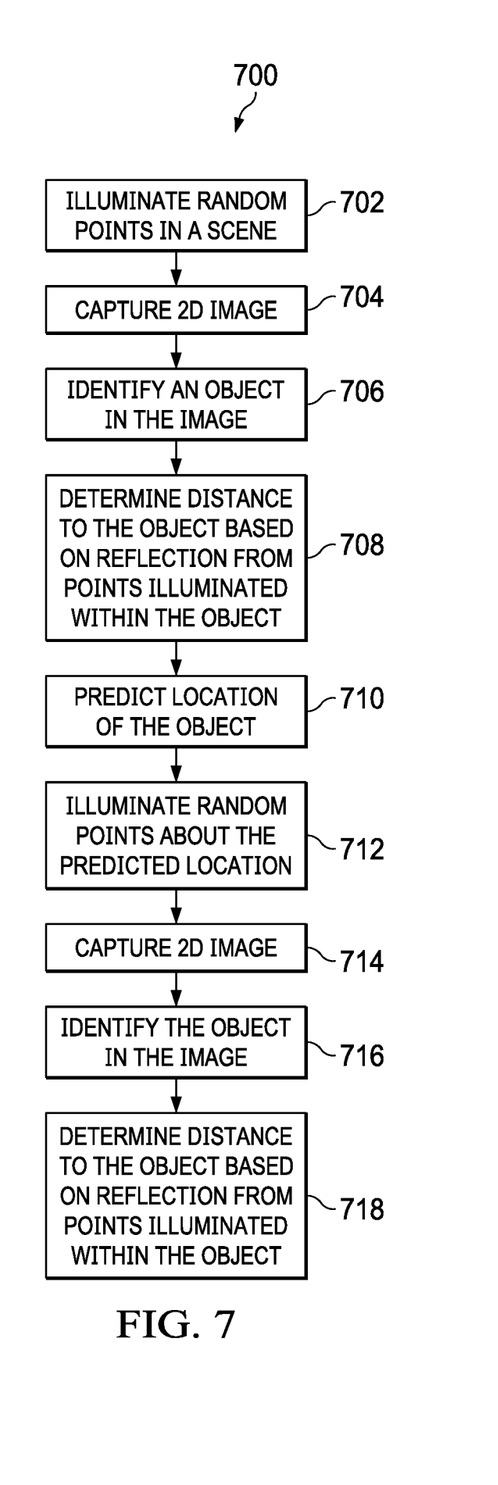
FIG. 7 shows a flow diagram for an example method for depth imaging in accordance with this description.

FIG. 7 shows a flow diagram for an example method 700 for depth imaging in accordance with this description. Though depicted sequentially as a matter of convenience, at least some of the actions shown can be performed in a different order and/or performed in parallel. Additionally, some implementations may perform only some of the actions shown. Operations of the method 700 may be performed by an implementation of the depth imaging system 100 or the depth imaging system 400. The method 700 includes operations that anticipate frame to frame movement of objects, and allow the depth imaging system 100 or the depth imaging system 400 to provide high-resolution depth imaging with reduced computational complexity.

In block 702, the location of objects in a scene is unknown, and the optical beam steering device 104 is controlled to direct a light beam to random locations in a scene. In implementations of the depth imaging system 400, the beam steering device 404 is controlled to direct the light beam.

In block 704, the optical image sensor 102 captures a 2D image of the scene. The image may be a visible light image or an infrared image. The image may be captured in conjunction with the beam generation of block 702.

In block 706, the 2D signal processing circuitry 106 identifies an object in the 2D image captured by the optical image sensor 102. Identification of the object may include classification of the various regions of the image, where the classification applies a label to each pixel of the image. The labels applied to the pixels may identify objects of interest. For example, in an ADAS, the labels may correspond to automobiles, pedestrians, cycles, buildings, road surfaces, trees, signage, and other objects encountered in the environment of vehicle operation. Identification of an object may also include feature extraction that identifies features, such as edges and boundaries associated with each labeled region of the image.

In block 708, the TOF processing circuitry 118 assigns distance values to the object identified in block 706 based on reflections of the light transmitted in block 702 that correspond to the location of the object in the image captured in block 704. The operations of block 702-708 constitute an initialization phase of depth information acquired with no prior information as to object location.

In block 710, one or more images that include the object have been acquired by the optical image sensor 102 and processed by the 2D signal processing circuitry 106. The 2D signal processing circuitry 106 includes the object tracking 208 that predicts the location of the object in a future image based on the location of the object in previously acquired images. The 2D signal processing circuitry 106 provides information predicting the location of the object in next image to the TOF processing circuitry 118.

The block 712, the TOF processing circuitry 118 controls the optical beam steering device 104 to direct a light beam to random points about the predicted location of the object. In implementations of the depth imaging system 400, the beam steering device 404 is controlled to direct the light beam. The number of points illuminated may be greatly reduced compared the operation of block 702 because only the area about the predicted location of the object is illuminated.

In block 714, the optical image sensor 102 captures a 2D image of the scene. The image may be a visible light image or an infrared image. The image may be captured in conjunction with the beam generation of block 712.

In block 716, the 2D signal processing circuitry 106 identifies the object in the 2D image captured by the optical image sensor 102 in block 714. Identification of the object may include classification and feature extraction.

In block 718, the TOF processing circuitry 118 assigns distance values to the object identified in block 716 based on reflections of the light transmitted in block 712 that correspond to the location of the object in the image captured in block 714.

Modifications are possible in the described embodiments, and other embodiments are possible, within the scope of the claims.

What is claimed is:

1. A system, comprising:
   an image sensor configured to receive an image;
   image processing circuitry coupled to the image sensor, the image processing circuitry configured to detect an object in the image;
   a beam steering device;
   time of flight (TOF) circuitry coupled to the beam steering device and to the image processing circuitry, the TOF circuitry configured to instruct the beam steering device to direct an optical beam based on the object detection; and
   a dichroic filter optically coupled to the image sensor and to the beam steering device, the beam steering device configured to:
      receive an illumination optical beam; and
      direct, by the beam steering device, a steered optical beam towards the dichroic filter responsive to the illumination optical beam;
   the dichroic filter configured to:
      direct the image towards the image sensor and away from the beam steering device;
      transmit the steered optical beam;
      receive a reflection of the steered optical beam; and
      direct the reflection of the steered optical beam towards the beam steering device.

2. The system of claim 1, wherein the image sensor and the beam steering device are co-located, and pixels of the image sensor are aligned with beam steering elements of the beam steering device.

3. The system of claim 1, wherein the beam steering device is a digital micromirror device.

4. The system of claim 1, further comprising:
   a light source optically coupled to the beam steering device, the light source configured to generate the illumination optical beam; and
   a photodiode coupled to the beam steering device and to the TOF circuitry, wherein the beam steering device is configured to direct a reflection of the optical beam to the photodiode.

5. The system of claim 4, further comprising:
   a polarization filter optically coupled to the light source and to the photodiode; and
   a polarization rotator optically coupled between the polarization filter and the beam steering device.

6. The system of claim 4, further comprising:
   an integration tunnel optically coupled between the light source and the beam steering device;
   a polarization rotator optically coupled to the beam steering device; and
   a retroreflective surface optically coupled to the polarization rotator.

7. The system of claim 1, wherein the time of flight (TOF) circuitry is configured to determine an object distance based on a time-of-flight or a phase of the optical beam.

8. A system, comprising:
   an image sensor configured to receive an image;
   image processing circuitry coupled to the image sensor, the image processing circuitry configured to detect an object in the image;
   a beam steering device;
   a photodiode optically coupled to the beam steering device;
   time of flight (TOF) circuitry coupled to the beam steering device, to the image processing circuitry, and to the photodiode, the TOF circuitry configured to instruct the beam steering device to direct an optical beam based on the object detection;
   a dichroic filter optically coupled to the image sensor and to the beam steering device; and
   a light source configured to produce an illumination optical beam;
   wherein the beam steering device configured to:
      receive the illumination optical beam; and
      direct a steered optical beam towards the dichroic filter responsive to the illumination optical beam;
   wherein the dichroic filter is configured to:
      direct the image towards the image sensor and away from the dichroic filter;
      receive a reflection of the steered optical beam;
      direct the reflection of the steered optical beam towards the beam steering device; and
      direct the reflection of the steered optical beam towards the photodiode; and
   wherein the photodiode is configured to detect the reflection of the steered optical beam.

9. The system of claim 8, wherein the image sensor and the beam steering device are co-located, and pixels of the image sensor are aligned with beam steering elements of the beam steering device.

10. The system of claim 8, further comprising:
    a polarization filter optically coupled to the light source and to the photodiode; and
    a polarization rotator optically coupled between the polarization filter and the beam steering device.

11. The system of 8, further comprising:
    a polarization filter optically coupled to the beam steering device;
    a polarization rotator optically coupled between the polarization filter and the dichroic filter; and
    an amplitude modulator optically coupled between the polarization filter and the photodiode, the amplitude modulator configured to receive the reflection of the optical beam and direct the reflection of the optical beam to the photodiode.

12. The system of claim 8, further comprising:
    an integration tunnel optically coupled between the light source and the beam steering device;

a polarization rotator optically coupled to the beam steering device; and a retroreflective surface optically coupled to the polarization rotator.

13. The system of claim 8, wherein TOF circuitry configured to determine an object distance based on the reflection of the steered optical beam detected by the photodiode.

14. The system of claim 13, wherein the TOF circuitry is further configured to:

instruct the beam steering device to direct optical beams to randomly selected locations, wherein the photodiode is configured to detect reflections of the optical beams;

identify one or more of the randomly selected locations corresponding to an object identified by the image processing circuitry; and determine a distance to the object based on a time-of-flight of the optical beam to the one or more of the randomly selected locations in accordance with the reflections of the optical beams.

15. A system comprising:

an image sensor;

an amplitude modulator;

a beam steering device configured to:

receive an illumination optical beam; and produce a steered optical beam responsive to the illumination optical beam;

a polarization filter optically coupled to the beam steering device, the polarization filter configured to transmit the steered optical beam to produce a first filtered beam;

a polarization rotator optically coupled to the polarization filter, the polarization rotator configured to polarization rotate the first filtered beam to produce a first rotated beam; and a dichroic filter optically coupled to the polarization rotator and to the image sensor, the dichroic filter configured to:

direct an image towards the image sensor and away from the polarization rotator;

transmit the first rotated beam;

receive a reflection of the first rotated beam; and direct the reflection of the first rotated beam towards the polarization rotator;

wherein the polarization rotator is configured to rotate the reflection of the first rotated beam to produce a second rotated beam; and wherein the polarization filter is configured to direct the second rotated beam to the amplitude modulator.

16. The system of claim 15, wherein the beam steering device is a phase spatial light modulator.

17. The system of claim 15, wherein the amplitude modulator is a digital micromirror device (DMD).

18. The system of claim 15, further comprising a photodiode optically coupled to the amplitude modulator, wherein the amplitude modulator is configured to direct the second rotated beam to the photodiode.

19. The system of claim 18, further comprising at least one processing device coupled to the photodiode, to the image sensor, and to the beam steering device.

20. The system of claim 19, further comprising an optical source coupled to the at least one processing device, the optical source configured to produce the illumination optical beam responsive to a signal received from the at least one processing device.

* * * * *